United States Patent [11] 3,583,378

[72] Inventor Warren K. Pattee
1200 East 44th St., Kansas City, Mo. 64110

[21] Appl. No. 814,245
[22] Filed Apr. 8, 1969
[45] Patented June 8, 1971

[54] CAPACITIVE DISCHARGE SOLID STATE IGNITION SYSTEM
8 Claims, 4 Drawing Figs.

[52] U.S. Cl. 123/148, 315/29
[51] Int. Cl. F02b 3/06
[50] Field of Search 123/148 (DC), 148 (E); 315/209, 214

[56] References Cited

UNITED STATES PATENTS 3,019,782 2/1962 Kuritza 123/148E
3,381,172 4/1968 Weiner 315/212
3,418,988 12/1968 Lewis et al. 123/148E

*Primary Examiner*—Laurence M. Goodridge
*Attorney*—D. A. N. Chase

ABSTRACT: Capacitive discharge ignition apparatus for an internal combustion engine employing an inverter comprising a solid state power oscillator and a step-up transformer. The transformer output is rectified and fed back to the oscillator to provide positive turnoff thereof each time the storage capacitor of the apparatus is discharged and to synchronize the oscillator frequency with the spark repetition rate, current for charging the capacitor being drawn through the transistor or transistors of the oscillator stage. A silicon controlled rectifier controls the charging and discharging of the capacitor, a trigger circuit employing transformer coupling to the gate of the SCR being arranged to prevent false retriggering.

PATENTED JUN 8 1971 3,583,378

INVENTOR
Warren K. Pattee

BY Schmidt, Johnson, Hovey, Williams & Chase.
ATTORNEYS.

CAPACITIVE DISCHARGE SOLID STATE IGNITION SYSTEM

In internal combustion engines for motor vehicles, boats, aircraft, and stationary applications, capacitive discharging ignition systems are a substantial improvement over the standard breaker points, condenser and ignition coil arrangement in use for a number of years. A capacitive discharge system provides a spark plug voltage having a faster rise time and materially flattens the voltage versus r.p.m. curve, the latter resulting in a much hotter spark at the higher engine speeds. Furthermore, savings in the life of spark plugs, distributor points, and condenser are realized, together with a decrease in fuel consumption.

However, in a capacitive discharge ignition system the oscillator stage of the circuitry must be carefully controlled both as to turnoff during capacitor discharge and as to frequency with varying engine speed. Operation of the oscillator while the capacitor is discharging could damage the components thereof, and failure of the oscillator frequency to follow the spark repetition rate would result in failure to supply the energy needed to recharge the capacitor during the interval between successive spark demands.

It is, therefore, the primary object of the present invention to provide an improved capacitive discharge ignition system in which positive turnoff of the oscillator thereof with the occurrence of each spark demand is assured, together with synchronization of the oscillator frequency with the spark repetition rate.

As a corollary to the foregoing object, it is an important aim of this invention to provide a system as aforesaid having a DC to DC converter wherein the high voltage output is directly fed back to the oscillator to achieve the positive turnoff and frequency control mentioned above.

It is a further object of the invention to provide an ignition system as aforesaid of increased efficiency to thereby render the system less expensive than prior capacitive discharge ignition systems since the need for a step-up transformer in the inverter of the toroidal type is obviated, the increased efficiency and attendant saving being achieved as a result of the aforesaid direct high voltage feedback to the oscillator.

Another important object of the invention is to provide a trigger circuit for controlling a silicon controlled rectifier employed to discharge the capacitor of the system, wherein such circuit isolates the low battery voltage from the high voltage converter output and prevents false retriggering of the SCR.

Figures 1, 2, 3, 4:
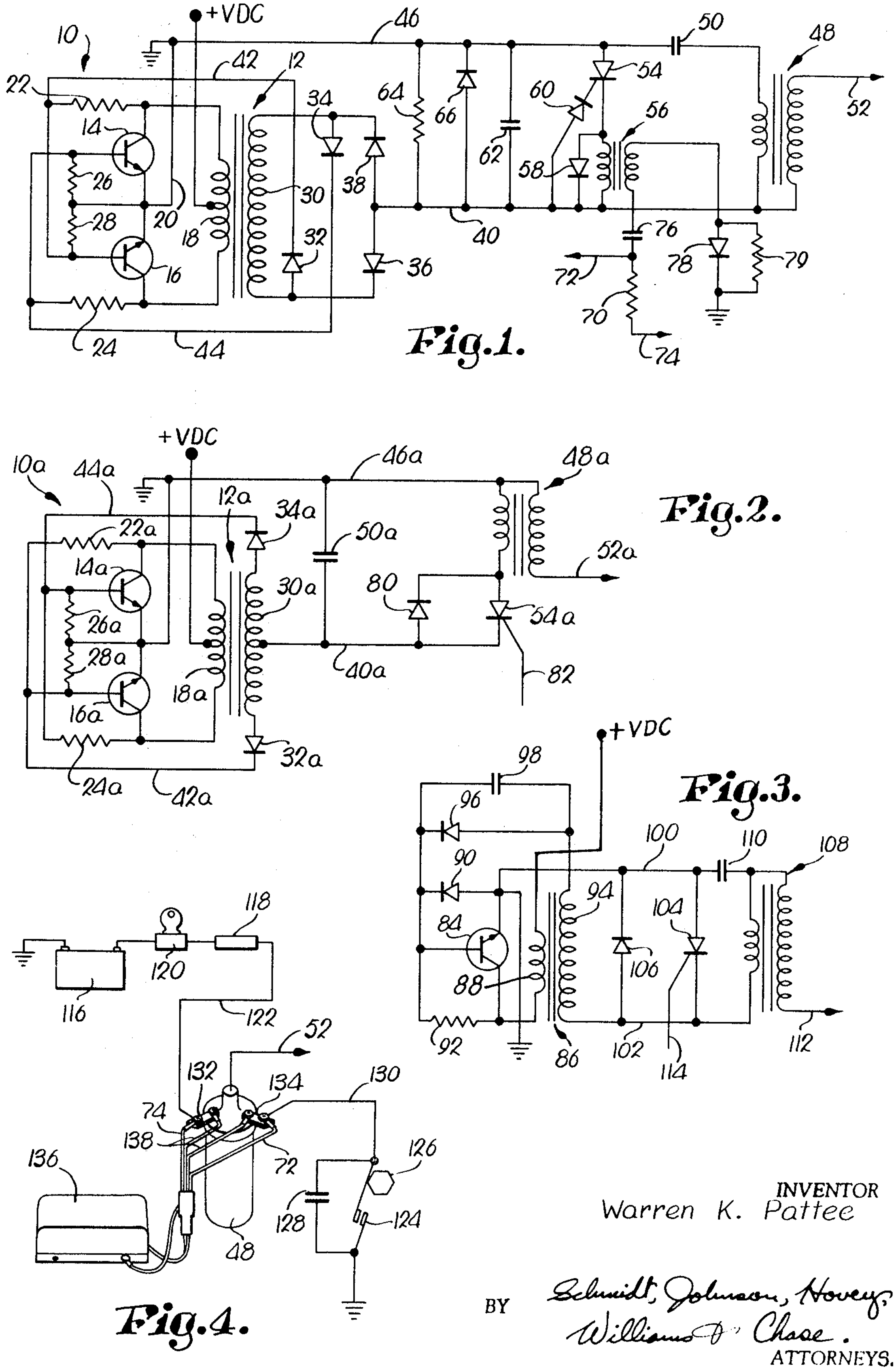
FIG. 1 is an electrical schematic diagram of the preferred form of the ignition system of the present invention.
FIG. 2 is an electrical schematic diagram of a modified form of the invention.
FIG. 3 is an electrical schematic diagram of a third form of the invention.
FIG. 4 is a diagrammatic and pictorial illustration showing the manner in which the invention is incorporated into the existing ignition system of an internal combustion engine.

Referring to FIG. 1, an inverter employs a power oscillator 10 in conjunction with a step-up transformer 12, the oscillator 10 comprising a pair of NPN transistors 14 and 16 connected for push-pull operation in a common emitter oscillator configuration. The transformer 12 has a primary winding 18 which is center tapped, the tap being connected to the positive side of a suitable low voltage direct current source, as indicated by the terminal labeled +VDC. Normally, such direct current source would comprise a 12 volt or 24 volt storage battery. The negative side of the battery supply is indicated by the ground symbol, the emitters of the transistors 14 and 16 being interconnected and grounded via a lead 20.

The transistors 14 and 16 are cross-coupled by a pair of resistors 22 and 24 connected from opposite ends of the primary winding 18 to the bases of transistors 16 and 14 respectively. The collectors of the transistors 14 and 16 are directly connected to opposite ends of the primary winding 18, and a pair of resistors 26 and 28 of relatively low ohmic value are connected across the emitter-base terminals of the transistors 14 and 16 respectively to provide base stability.

The transformer 12 has a secondary winding 30 which delivers an alternating potential on the order of 350 volts. The secondary winding 30 is connected to a full-wave bridge rectifier consisting of four diodes 32, 34, 36 and 38. The negative side of the high voltage rectifier output appears at the anodes of the diodes 36 and 38 from which a lead 40 extends. The positive side of the rectifier output appears at the cathodes of diodes 32 and 34, but such cathodes are not directly interconnected. Instead, a high voltage feedback connection 42 extends from the cathode of diode 32 to the base of transistor 16. Similarly, a feedback connection 44 extends from the cathode of diode 34 to the base of transistor 14. A lead 46 is grounded as indicated by the symbol and is connected to the lead 20 extending from the emitters of the two transistors 14 and 16, the lead 46 being at the positive potential of the rectified high voltage output from the bridge rectifier network.

An ignition coil 48 of the standard type has a primary winding connected at its lower end to the negative rectified high voltage lead 40, and connected at its upper end to the positive lead 46 through a storage capacitor 50. A lead 52 extends from the secondary winding of the ignition coil 48 to deliver the output to the rotor of the distributor of the internal combustion engine.

A silicon controlled rectifier 54 has its anode connected to the lead 46 and its cathode connected to lead 40 through the secondary winding of a trigger transformer 56. The secondary of the trigger transformer 56 is shunted by a diode 58 having its anode connected to the cathode of the SCR 54. A diode 60 is connected from the lead 40 to the gate of the SCR 54, the diode 60 being oriented with its cathode connected to the SCR gate terminal. A capacitor 62 is connected across leads 40 and 46 for purposes of spike suppression, and a bleeder resistor 64 is likewise connected across leads 40 and 46. A diode 66 is also connected across leads 40 and 46 for a purpose to be discussed hereinafter.

A resistor 70 interconnects a lead 72 and a lead 74, the lead 72 extending to the breaker points (not shown in FIG. 1) while the lead 74 extends to the positive terminal through the customary ignition switch (also not shown). A capacitor 76 connects the lead 72 to the lower end of the primary winding of the trigger transformer 56, the upper end of the primary winding being connected to ground by a diode 78 having its cathode at ground potential. A resistor 79 across diode 78 forms a discharge path for the capacitor 76.

FIG. 2 is a modification of the circuitry of FIG. 1, corresponding components and leads being designated by the same reference characters as above with the addition of the "*a*" notation. The FIG. 2 arrangement differs from FIG. 1 in that the bridge rectifier is not employed and an equivalent circuit configuration for handling the charging and discharging of the storage capacitor is illustrated. The secondary winding **30*a* of the step-up transformer 12*a* is center tapped so only two diodes 32*a* and 34*a* are utilized for full-wave rectification. The storage capacitor 50*a* is connected directly across leads 40*a* and 46*a*, and the SCR 54*a* is in series with the primary winding of the ignition coil 48*a*. The anode-cathode circuit of the SCR 54*a* is shunted in the reverse direction by a diode 80. Other circuit details are eliminated for simplicity, including the trigger circuit for the SCR 54*a* which would be connected to the gate lead 82 and the cathode of the SCR 54*a***.

A further modification is illustrated in FIG. 3 in simplified form, and comprises an oscillator stage having a single NPN transistor 84. A step-up transformer 86 has a primary winding 88, the lower end thereof being connected to the collector of transistor 84. A diode 90 for reverse voltage protection connects the grounded emitter of transistor 84 to the base of the transistor 84. Operating bias is provided by a resistor 92 interconnecting the collector and base terminals, the collector being maintained at the positive potential of the DC supply via primary winding 88 as indicated by the +VDC terminal.

The step-up transformer 86 has a secondary winding 94, the upper end thereof being connected to the base of transistor 84 by a half-wave rectifier 96 which also presents a high voltage feedback connection from its cathode to the transistor base. A capacitor 98 is connected from the upper end of secondary winding 94 to the base of transistor 84 and, in effect, replaces the second transistor utilized in the push-pull configurations of FIGS. 1 and 2 and provides spike suppression on diode 96.

A lead 100 extends from the emitter of transistor 84 and is at the potential of positive rectified output. A lead 102 is connected to the lower end of the secondary winding 94 and comprises the negative high voltage return. An SCR 104 is connected across the leads 100 and 102, together with an oppositely poled diode 106. An ignition coil 108 has a primary winding whose lower end is connected to the lead 102, the upper end thereof being connected to the lead 100 through a storage capacitor 110. A lead 112 extends from the secondary winding of the ignition coil 108 to supply the distributor rotor. As in FIG. 2, the trigger circuit for the SCR 104 is omitted, but would be connected to the gate lead 114 and the cathode of the SCR 104.

An example of the manner in which the ignition apparatus of the present invention is installed in an existing system is illustrated in FIG. 4. The battery is shown at 116 and has its positive terminal connected to a ballast resistor 118 through a key-operated ignition switch 120. A lead 122 extends from the ballast resistor 118 and would normally be connected to an appropriate contact on the housing of the ignition coil 48. The breaker points are diagrammatically illustrated at 124 and are operated by the usual breaker cam 126. A condenser 128 is connected in parallel with the points 124. A lead 130 is connected to the ungrounded condenser plate and would normally extend to an appropriate terminal on the ignition coil housing. However, in the installation of the apparatus of the present invention, the leads 122 and 130 are disconnected and reconnected to a pair of terminal strips 132 and 134 respectively, which are mounted on the existing primary winding terminal of the ignition coil 48. As is apparent from viewing FIG. 4, the terminal strips 132 and 134 enable the leads 72 and 74 to be directly connected to leads 130 and 122 respectively, the leads 72 and 74 comprising two of the wires of a four conductor cable extending from a housing 136 that encases the circuitry of the present invention, such as illustrated in FIG. 1. The remaining pair of wires 138 are connected to the existing primary winding terminals of the ignition coil 48 to complete the installation.

In the operation of the FIG. 1 embodiment, the rectified voltage appearing across leads 40 and 46 charges the capacitor 50 through the primary winding of the ignition coil 48. Assuming that the breaker points 124 are closed, lead 72 is at ground potential and hence no signal is applied to the primary winding of the trigger transformer 56. When a firing command is produced by the opening of the points 124, the ground connection is removed from the lead 72 to charge the capacitor 76, this occurring since the lead 74 is at the positive battery potential. The charging of capacitor 76 applies a trigger pulse to the primary of transformer 56, whereupon the secondary thereof gates the SCR 54 through the diode 60. This places the anode-cathode circuit of the SCR 54 in conduction to discharge the capacitor 50 through the primary winding of the ignition coil 48, thereby producing a very high voltage output pulse (on the order of 30,000 volts, for example) which is fed to the appropriate spark plug of the engine in the usual manner. It should be noted that the ignition transformer 56 serves to isolate the low voltage battery potential from the higher voltages encountered in the capacitor discharge circuit. In particular, the diode 58 shorts across the secondary winding of the transformer 56 during conduction of the SCR 54, thereby maintaining the isolation and preventing noise or any other unwanted signal in the primary of the transformer 56 from retriggering the SCR 54. Therefore, false triggering is positively precluded.

During the time that the capacitor 50 is discharging, it is requisite that the oscillator 10 cease operation until such time that the SCR 54 returns to its nonconductive state and recharging of the capacitor 50 is to be effected. If this were not accomplished, heavy currents would flow in the secondary winding 30 of the step-up transformer 12, the winding 30 being shorted at the time that the capacitor 50 is discharging since the SCR 54 during conduction represents a short circuit to the rectified high voltage output received from the emitters of transistors 14 and 16 and the anodes of diodes 36 and 38. This short circuit, however, is advantageously utilized to cause the oscillator 10 to momentarily cease oscillation since the positive high voltage output is received through the bases and the emitters of transistors 14 and 16 due to the feedback connections 42 and 44. Such connections provide oscillator turnoff by shorting the emitter-base circuits of the transistors 14 and 16 at the time that the output of the bridge rectifier network is shorted by the gating of the SCR 54. This may be appreciated when it is considered that the feedback connections 42 and 44 extend from the positive side of the rectifier network output to the bases of the respective transistors 16 and 14, while the lead 40 (connected to the negative side of the rectifier network output) when the SCR 54 is in conduction is effectively connected via leads 46 and 20 to the emitters of the transistors 14 and 16. Therefore, push-pull operation of the oscillator 10 must terminate at this time since the two transistors 14 and 16 cannot alternately conduct as in normal oscillator operation. (It is understood, of course, that each transistor, when the oscillator 10 is in operation, alternates between a conductive and nonconductive state, one transistor conducting while the other is nonconducting in typical push-pull fashion.) With respect to the modified circuitry of FIG. 2, operation is the same as above except that the capacitor *50a* is not charged through the primary of ignition transformer *48a* due to the parallel arrangement, which is advantageous at high engine r.p.m. where the alternate charge and discharge of the capacitor *50a* occurs at a relatively high rate.

Since direct feedback of the rectified high voltage to the oscillator 10 is employed to provide positive oscillator turnoff, a high efficiency transformer such as a toroidal type is not required in FIGS. 1 and 2 for the step-up transformers 12 and *12a*. Relatively inexpensive transformers of laminated construction are ideally suited to both of these embodiments.

Another important consideration is the fact that the oscillator frequency must necessarily increase with the spark repetition rate which increases with the speed of the engine. Failure of the oscillator 10 to properly synchronize with the spark repetition rate would cause insufficient energy to be available for charging of the capacitor 50, particularly at higher engine speeds. The direct high voltage feedback effected by the connections 42 and 44 accomplishes this frequency control since the positive oscillator turnoff feature discussed above assures that the oscillator must restart after each capacitor discharge and thereby follow its load frequency.

When the secondary voltage of the ignition transformer 48 collapses at the termination of each discharge of the capacitor 50, the SCR 54 is turned off by the reverse voltage from the primary of the ignition coil 48, such reverse voltage slightly charging capacitor 50 through diode 66. This removal of the previous short by return of the SCR 54 to its nonconductive state and the reverse voltage across the capacitor 50 quickly allows the transistors 14 and 16 to resume oscillation.

The half-wave embodiment of FIG. 3 operates in a manner similar to that as discussed above, except that a push-pull oscillator stage is not employed and thus the resetting action for the single transistor 84 is provided by the capacitor 98 rather than by a second transistor in push-pull configuration. In order to get sufficient output for most applications however, it will be necessary to use a highly efficient transformer configuration for the step-up transformer 86 rather than a laminated transformer as discussed above with respect to the full-wave embodiments of FIGS. 1 and 2.

Having thus described the invention, what I claim as new and desired to be secured by Letters Patent is:

1. In an ignition system for an internal combustion engine where firing potential is delivered by a high voltage ignition coil or the like in response to firing commands having a repetition rate dependent upon engine speed, capacitive discharge ignition apparatus comprising:

an oscillator operable in response to excitation by a direct current;

a step-up transformer having a primary winding coupled with the output of said oscillator, and a secondary winding for providing an alternating current substantially higher in voltage than said direct current;

a storage capacitor;

rectifier means coupled with said secondary winding and said capacitor for rectifying said alternating current and charging the capacitor with the rectified current when the oscillator is operative;

a feedback connection from the output of said rectifier means to said oscillator;

means for connecting said capacitor to said coil to establish a path for current flow through the coil upon discharge of the capacitor;

control means coupled with said capacitor for discharging the latter and momentarily shorting the output of said rectifier means in response to each of said firing commands, said feedback connection terminating operation of the oscillator in response to said shorting of the rectifier means output during said discharging of the capacitor, whereby to provide positive oscillator turnoff with the occurrence of each firing command and synchronization of the oscillator frequency with the repetition rate of the commands, said oscillator including at least one active electrical device provided with a plurality of terminals and having conductive and nonconductive states assumed alternately during operation of the oscillator, said feedback connection delivering said rectified current to a first of said terminals for conduction through said device to a second of said terminals thereof, whereby said first and second terminals are shorted across said rectifier means output when the latter is shorted by the control means, thereby effecting termination of oscillator operation; and circuit means connecting said second terminal to said capacitor to effect said charging of the latter when said device is in its conductive state.

2. Apparatus as claimed in claim 1, there being a pair of said devices arranged for push-pull operation and each comprising a transistor having an emitter, a base, and a collector presenting said plurality of terminals, there being a pair of said feedback connections from said rectifier means output to the first terminals of respective devices, said second terminal of each device being the emitter thereof, said emitters being interconnected to provide a common emitter oscillator configuration.

3. Apparatus as claimed in claim 1, said control means including a silicon controlled rectifier having an anode, a cathode, and a gate, said anode and cathode being serially connected in said path for current flow through the coil, a trigger transformer having a primary winding and a secondary winding, means connected with said primary winding of the trigger transformer for delivering a pulse thereto in response to each firing command, and means coupling said secondary winding of the trigger transformer with said cathode and said gate to trigger the silicon controlled rectifier in response to delivery of said pulse.

4. Apparatus as claimed in claim 3, said control means further including diode shunting said secondary winding of the trigger transformer and having an anode and a cathode, said anode of the diode being connected with the cathode of the silicon controlled rectifier whereby, when the rectifier conducts, the diode is also placed in conduction to short the secondary winding of the trigger transformer.

5. Apparatus as claimed in claim 1, said control means including a switching component serially connected in said current path for connection of said coil and said component in series across the output of said rectifier means, said capacitor being connected across the output of said rectifier means, whereby the capacitor and the coil are coupled in a parallel arrangement such that the capacitor is not charged through the coil.

6. In an ignition system for an internal combustion engine where firing potential is delivered by a high voltage ignition coil or the like in response to firing commands having a repetition rate dependent upon engine speed, capacitive discharge ignition apparatus comprising:

an oscillator operable in response to excitation by a direct current;

a step-up transformer having a primary winding coupled with the output of said oscillator, and a secondary winding for providing an alternating current substantially higher in voltage than said direct current;

a storage capacitor;

rectifier means coupled with said secondary winding and said capacitor for rectifying said alternating current and charging the capacitor with the rectified current when the oscillator is operative;

a feedback connection from the output of said rectifier means to said oscillator;

means for connecting said capacitor to said coil to establish a path for current flow through the coil upon discharge of the capacitor;

control means coupled with said capacitor for discharging the latter and momentarily shorting the output of said rectifier means in response to each of said firing commands, said feedback connection terminating operation of the oscillator in response to said shorting of the rectifier means output during said discharging of the capacitor, whereby to provide positive oscillator turnoff with the occurrence of each firing command and synchronization of the oscillator frequency with the repetition rate of the commands, said oscillator including at least one transistor device provided with input and output terminals for said rectified current and having conductive and nonconductive states assumed alternately during operation of the oscillator, said feedback connection delivering said rectified current to said input terminal for conduction through said device to said output terminal thereof, whereby said input and output terminals are shorted across said rectifier means output when the latter is shorted by the control means, thereby effecting termination of oscillator operation; and circuit means connecting said output terminal to said capacitor to effect said charging of the latter when said device is in its conductive state.

7. In an ignition system for an internal combustion engine where firing potential is delivered by a high voltage ignition coil or the like in response to firing commands having a repetition rate dependent upon engine speed, capacitive discharge ignition apparatus comprising:

an oscillator operable in response to excitation by a direct current;

a step-up transformer having a primary winding coupled with the output of said oscillator, and a secondary winding for providing an alternating current substantially higher in voltage than said direct current;

a storage capacitor;

rectifier means coupled with said secondary winding and said capacitor for rectifying said alternating current and charging the capacitor with the rectified current when the oscillator is operative;

a feedback connection from the output of said rectifier means to said oscillator;

means for connecting said capacitor to said coil to establish a path for current flow through the coil upon discharge of the capacitor; and control means coupled with said capacitor for discharging the latter and momentarily shorting the output of said rectifier means in response to each of said firing commands, said feedback connection terminating operation of the oscillator in response to said shorting of the rectifier means output during said discharging of the capacitor, whereby to provide positive oscillator turnoff with the occurrence of each firing command and synchronization of the oscillator frequency with the repetition rate of the commands, said oscillator including at least one active electrical device provided with a plurality of terminals and having conductive and nonconductive states assumed alternately during operation of the oscillator, said feedback connection delivering said rectified current to a first of said terminals for conduction through said device to a second of said terminals thereof, whereby said first and second terminals are shorted across said rectifier means output when the latter is shorted by the control means, thereby effecting termination of oscillator operation.

8. In an ignition system for an internal combustion engine where firing potential is delivered by a high voltage ignition coil or the like in response to firing commands having a repetition rate dependent upon engine speed, capacitive discharge ignition apparatus comprising:

an oscillator operable in response to excitation by a direct current;

a step-up transformer having a primary winding coupled with the output of said oscillator, and a secondary winding for providing an alternating current substantially higher in voltage than said direct current; a storage capacitor;

rectifier means coupled with said secondary winding and said capacitor for rectifying said alternating current and charging the capacitor with the rectified current when the oscillator is operative;

means for connecting said capacitor to said coil to establish a path for current flow through the coil upon discharge of the capacitor; and control means coupled with said capacitor for discharging the latter in response to each of said firing commands, said control means including a silicon controlled rectifier having an anode, a cathode, and a gate, said anode and cathode being serially connected in said path for current flow through the coil, a trigger transformer having a primary winding and a secondary winding, means connected with said primary winding of the trigger transformer for delivering a pulse thereto in response to each firing command, means coupling said secondary winding of the trigger transformer with said cathode and said gate to trigger the silicon controlled rectifier in response to delivery of said pulse, and a diode shunting said secondary winding of the trigger transformer and having an anode and a cathode, said anode of the diode being connected with the cathode of the silicon controlled rectifier whereby, when the rectifier conducts, the diode is also placed in conduction to short the secondary winding of the trigger transformer.